Sept. 10, 1968            D. L. MILLER            3,400,795
ELECTROMAGNETIC CLUTCH WITH TORQUE RESPONSIVE DISCONNECT MEANS
Filed March 8, 1967            2 Sheets-Sheet 1
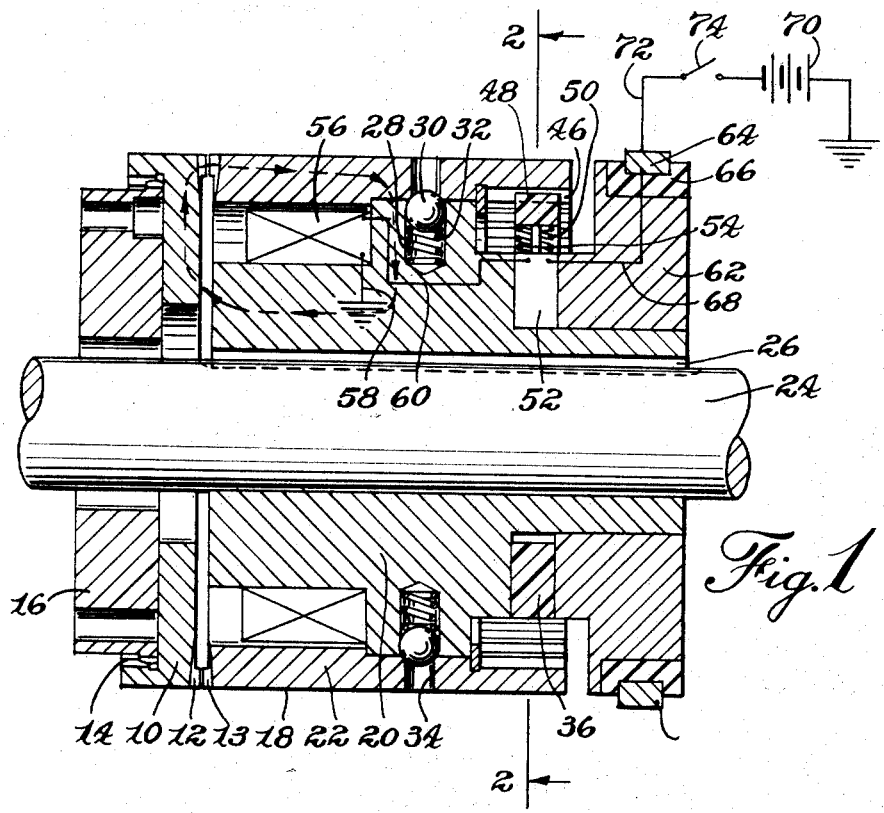
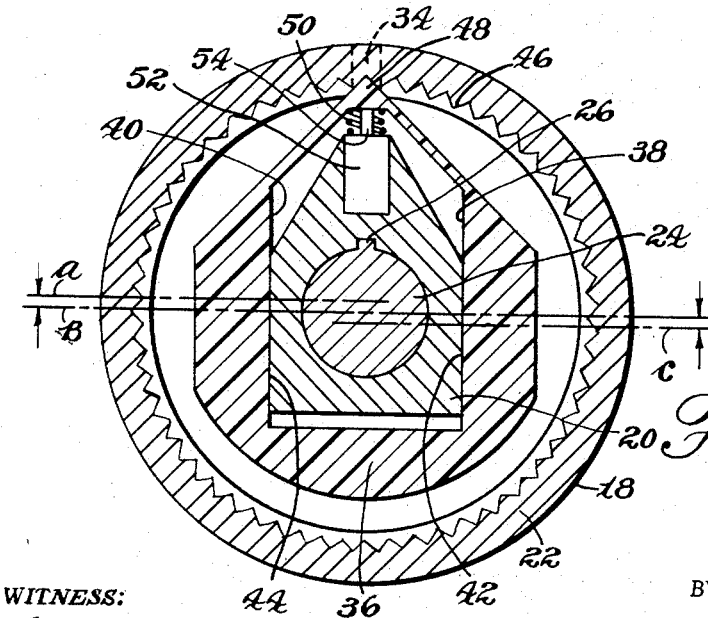
WITNESS:
Esther M. Stockton
INVENTOR.
Donald L. Miller
BY
W. S. Thompson
ATTORNEY Sept. 10, 1968           D. L. MILLER           3,400,795
ELECTROMAGNETIC CLUTCH WITH TORQUE RESPONSIVE DISCONNECT MEANS
Filed March 8, 1967           2 Sheets-Sheet 2
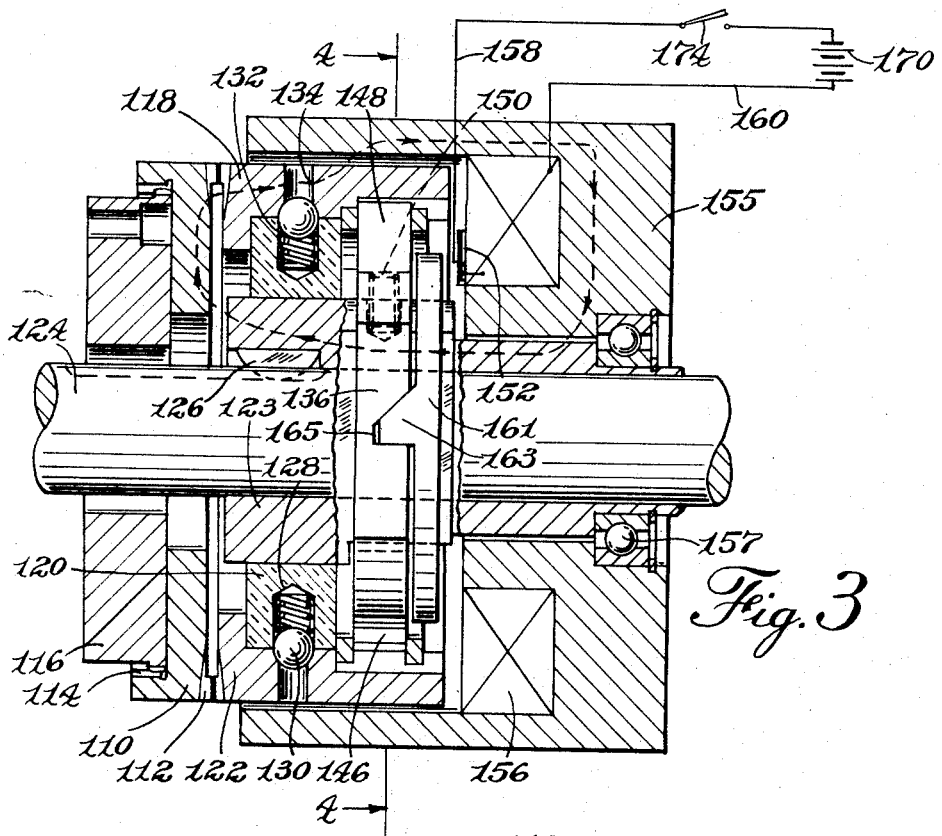
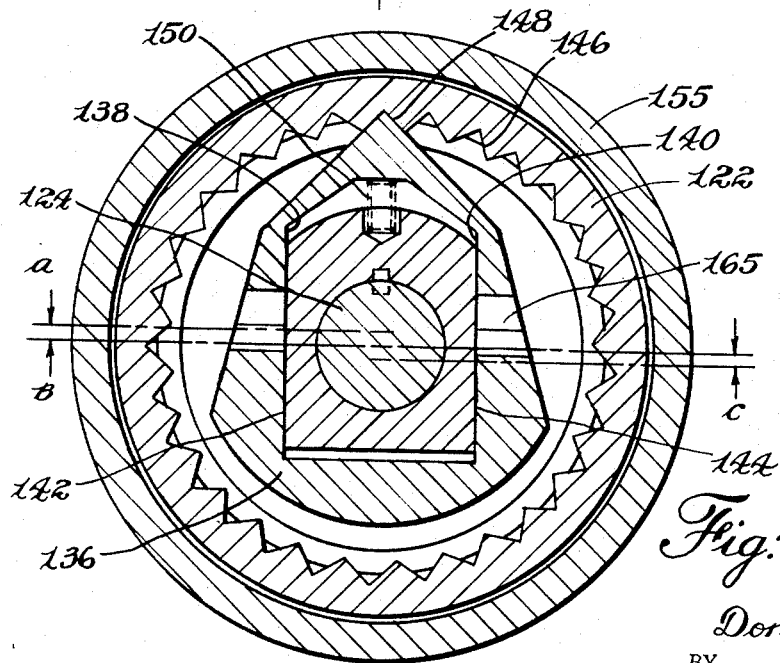
WITNESS:
*Esther M. Stockton*
INVENTOR.
*Donald L. Miller*
BY
*W. S. Thompson*
ATTORNEY

United States Patent Office 3,400,795
Patented Sept. 10, 1968

3,400,795
ELECTROMAGNETIC CLUTCH WITH TORQUE RESPONSIVE DISCONNECT MEANS
Donald L. Miller, Horseheads, N.Y., assignor to The Bendix Corporation, a corporation of Delaware
Filed Mar. 8, 1967, Ser. No. 621,533
4 Claims. (Cl. 192—56)

ABSTRACT OF THE DISCLOSURE

An electromagnetic clutch having an over-torque triggered centrifugal disconnect mechanism. The disconnect mechanism consists of a deactivating switch in a circuit with an electromagnetic actuating coil which is controlled by a centrifugal weight member. The centroid of mass of the weight member is normally offset from its spin axis in a direction such that it has no influence on the deactivating switch. On obtaining an over-torque condition, a slight amount of relative slip between clutch members (slip clutch) causes a displacement of the centrifugal weight member sufficient to move its centroid on the opposite side of the spin axis. This action, in effect, arms the weight member such that by means of centrifugal force, it will deactivate the clutch through the deactivating switch.

---

The simplest case of providing overload protection to rotating machinery is by a slip clutch which will slip at a predetermined torque, permitting two clutch segments to slip relatively. A disadvantage of this arrangement is that it produces high wear between the slipping parts and it transmits some torque during slipping, making it difficult to detect that an overload condition has or does exist and requires corrective action. Thus, one is prone to continue to abuse the apparatus in which the clutch is used and also appreciably shorten clutch life.

Another straightforward expedient would be the use of a shear pin or toggle locking means which still permits rotation of the parts and wear until the machine is shut down, but would clearly indicate that an overload existed and, in fact, would not be reusable until manually reset or replaced, usually with great effort.

The present invention has, as its objective, the provision of overload protection for an electromagnetic clutch in which the clutch parts are subject to only an initial triggering slip which operates mechanism to deenergize the main clutch to interrupt torque transmission and does not require continuous wear inducing slip.

It is another object of my invention to provide a torque release mechanism which, on shutdown, is automatically resettable for the next operation without requiring manual resetting or replacement of parts.

It is a still further object of my invention to provide an electromagnetic clutch with decoupling means actuated by initial slight displacement of a torque release slip clutch and operative to maintain disengagement as long as clutch driving speed is not reduced below a preselected value.

Other objects and advantages of my invention will become apparent on consideration of the attached description and drawings wherein:

FIGURE 1 is a cross-sectional view of a preferred embodiment of my invention partially schematicized;

FIGURE 2 is a sectional view taken along section line 2—2 of FIGURE 1 showing in greater detail a centrifugal trip switch mechanism;

FIGURE 3 is a cross-sectional view of a second embodiment of my clutch and disconnect means; and FIGURE 4 is a sectional view taken along section line 4—4 of FIGURE 3.

Referring to FIGURES 1 and 2, the clutch is comprised of a first rotatable clutch member 10 having a first ring of clutch torque transmitting teeth 12 formed on a radial face. Clutch member 10 is mounted by spline 14 to output member or adapter plate 16 which is adapted to be affixed to some driven device or machine.

A second rotatable clutch member is generally designated by numeral 18 and is comprised of inner and outer relatively rotatable segments 20 and 22, respectively, which are radially concentric to one another for at least a portion of their length. Inner segment 20 is keyed to driving shaft 24 at 26.

Inner segment 20 has a plurality of radially drilled bores 28 in which are disposed balls 30 and springs 32 and which cooperate with radially drilled holes 34 in outer segment 22 to normally lock the inner and outer members together for unitary rotation. Spring-biased balls 30 thus comprise a torque release slip clutch operative to permit relative rotation between members 20 and 22 when transmitted torque overcomes springs 32. The slip clutch may have many forms and such are known in the art, for example, spring-loaded friction discs.

A centrifugal weight member 36 is disposed in the plane of section 2—2 and more clearly illustrated in FIGURE 2, and has a pair of inner parallel faces 38 and 40 which slidably contact mating parallel faces 42 and 44, respectively, formed on inner segment 20 which is straddled by the centrifugal member. Thus, centrifugal member 36 may move along a radial path relative to segment 20. A ring of cam teeth 46 are formed on the inner diameter of outer segment 22 in a common plane with centrifugal member 36. A tapered cam follower 48 which mates with teeth 46 is formed on the outer surface of member 36 and is biased into engagement with teeth 46 by means of a spring 50 interposed between members 20 and 36.

A normally-closed electrical switch 52 is disposed in inner member 20 radially inwardly of follower 48 which has a connected plunger 54 for actuating switch 52 in an open mode when moved radially inwardly.

The mass of centrifugal member 36 is so designed that the centroid of mass is offset a small spaced distance from the clutch rotational or spin axis. Referring to FIGURE 2, the mass centroid is designed to fall on line A, whereas the clutch rotational axis, axis of member 20, falls on line B, thus insuring, in the normal case, that centrifugal force of member 36 assists in maintaining engagement of follower 48 with cam teeth 46. Also, by design, the amount of mass centroid offset is less than the root to peak dimension of cam teeth 46.

An annular electromagnetic coil 56 is secured to inner segment 20 having one lead 58 grounded to the clutch and a power supply lead 60 connected to switch 52. An annular member 62 is affixed to the end of inner segment 20 and contains a slip ring electrical connection 64 set in electrical insulating material 66. Slip ring 64 is connected to switch 52 by power lead 68. An external power source is represented by battery 70, and is connected to slip ring 64 by lead 72 (through brushes not shown) containing on-off switch 74.

In operation, torque release or slip clutch 30 normally engages inner and outer members 20 and 22 for unitary movement, and switch 52 is normally closed, completing the circuit from slip ring to coil. As on-off switch 74 is closed, coil 56 is energized, attracting first clutch member 10 into engagement with member 22 so that teeth 12 and 13 are in torque transmitting engagement. Rotation of shaft 24 is thus transmitted to output member 16. Spring 50 and centrifugal force of member 36 insure full engagement of follower 48 in cam teeth 46, insuring that switch 52 maintains its normally closed mode.

If, now a torque overload condition is reached, overcoming the preload bias of springs 32, balls 30 will be cammed inwardly, permitting relative rotation between inner and outer segments 20 and 22 which need to proceed only a small triggering amount before cam teeth 46 have forced centrifugal member 36 radially inwardly, actuating switch 52 to an open mode, deenergizing coil 56 and decoupling clutch teeth 12 and 13. The movement of centrifugal member 36 is sufficient so that the mass centroid passes through the axis of rotation, for example, to line C, thus reversing the centrifugal effect so that centrifugal force is sufficient to hold switch 52 in the open mode, even though the torque load has now disappeared due to clutch decoupling. Only a small triggering movement between inner and outer segments is necessary and as the clutch is soon after decoupled, no further wear between these parts occurs even though driving shaft 24 may continue to rotate indefinitely.

Once the difficulty has been observed by the automatic shut-down of driven member 16, the operator will shut off the power drive to shaft 24, and repair or correct the condition causing overload. No attention need be given to the clutch; however, as on shut down, the centrifugal force of member 36 will degenerate until less than the bias of spring 50, whereupon member 36 will be moved upwardly relative to the orientation of FIGURE 2, closing switch 52 and rearming the device automatically for the next start. Switch 52 which may be a commonly-purchased item often will have itself an internal spring which may make unnecessary the provision of an additional spring 50.

Referring to FIGURES 3 and 4, a second embodiment of my invention is shown, applying my disconnect mechanism to a clutch having a stationary electromagnetic coil.

This clutch is comprised of a first rotatable clutch member 110 having a first ring of clutch torque transmitting teeth 112 formed on a radial face. Clutch member 110 is mounted by spline 114 to output member or adapter plate 116 which is adapted to be connected to some driven device or machine.

A second rotatable clutch member is generally designated by numeral 118 and is comprised of inner and outer relatively rotatable segments 120 and 122, respectively, which are radially concentric to one another for at least a portion of their length. Inner segment 120 is secured to guide member 123 for unitary rotation at all times. Member 123 is, in turn, keyed to drive shaft 124 at 126. Member 123 is formed from magnetic flux-conducting material, whereas member 120 is of non-magnetic conducting material.

Inner segment 120 has a plurality of radially-drilled bores 128 in which are disposed balls 130 and springs 132 and which cooperate with radially-drilled holes 134 in outer segment 122 to normally lock the inner and outer members together for unitary rotation. Spring-biased balls 130 thus comprise a torque release slip clutch operative to permit relative rotation between members 120 and 122 when transmitted torque overcomes springs 132.

A centrifugal weight member 136, not in section, is disposed in the plane of section 4—4 and is more clearly illustrated in FIGURE 4 and has a pair of inner parallel faces 138 and 140 which slidably contact mating parallel faces 142 and 144, respectively, formed on guide member 123 which is straddled by the centrifugal member. Thus, centrifugal member 136 may move along a radial path relative to guide 123. A ring of cam teeth 146 is formed on the inner diameter of outer segment 122 in a common plane with centrifugal member 136. A tapered cam follower 148 which mates with teeth 146 is formed on the outer surface of member 136 and is biased into engagement with teeth 146 by means of a spring 150.

The FIGURE 3 clutch departs from the FIGURE 1 embodiment in that it has a stationary magnet body member 155 containing a stationary or fixed annular coil 156 having a pair of electrical leads 158 and 160 for connection to power source 170. Magnet body member 155 is supported on guide member 123 by means of bearings 157. A normally-closed, magnetically-responsive reed relay switch 152 is disposed on a radially exposed face of coil 156 facing in close proximity the centrifugal member 136.

An annular permanent magnet member 161 is interposed between switch 152 and weight 136 and is of generally simple ring-shaped configuration with the addition of a pair of ramp cams or ears 163 which fit into slots 165 formed in the centrifugal member 136. In the normal case, magnetic attraction between members 165 and 136 maintains magnet 161 in the retracted position as illustrated in FIGURE 3. In this position, magnet 161 is sufficiently remote from proximity reed switch 152 so as not to affect its normally-closed mode.

When shaft 124 is rotating at a sufficiently high speed and an over-torque condition is obtained, slip clutch 130 permits movement of outer segment 122 relative to inner segment 120 and guide 123. Teeth 146 thus force cam weight member 136 downwardly, causing a reversal of centroid of mass to the opposite side of its spin axis. Centrifugal force thus takes over, moving weight 136 down, and through slots 165 and cams 163, displacing magnet 161 in closer proximity to switch 152. Magnet force operates to open reed contacts of switch 152, deenergizing coil 156, causing disengagement of the main clutch teeth. This condition is maintained as long as shaft 124 rotates at above a minimum speed and will automatically reset after shut-down similar to the FIGURE 1 embodiment. Magnet 161 may, of course, be only partially magnetic with inserts in its outer ring and spring means biasing it into engagement with weight 136, if desired.

It will be seen that the objectives of the invention have been realized by providing an automatic resettable torque overload actuated disconnect mechanism for electromagnetic clutches which eliminates, for the most part, wear as it actuates fully with a very small degree of relative movement.

I claim:

1. An electromagnetic clutch having disconnect mechanism comprising:
   a first rotatable clutch member;
   a second rotatable clutch member axially aligned with said first clutch member;
   said first clutch member having a mounting to permit axial movement into and out of clutch engagement with said rotating clutch member;
   electromagnetic coil means having an electrical power supply lead operative to generate magnetic flux attracting said first clutch member into clutch engagement when energized;
   said second rotating clutch member comprised of inner and outer concentric segments which are movable rotationally relative to one another;
   torque release means operative to normally lock said inner and outer segments for unitary movement, and further operative to release said inner and outer segments, permitting relative rotation therebetween when clutch-transmitted torque exceeds a preset release amount;
   a centrifugal member slidably connected to said inner segment to permit relative radial movement therewith, said centrifugal member having a mass centroid offset a small spaced distance from the axial centerline of said inner segment and urged radially outwardly in a first direction by centrifugal force related to the speed of clutch rotation;
   cam means formed in said outer clutch segment radially outwardly of said centrifugal member, said cam means receiving said centrifugal member in contactive engagement, said cam means operative on relative rotation between said inner and outer segments to displace said centrifugal member radially a distance greater than the centroid offset to diametrically reverse centrifugal force effect of said centrifugal member so that it moves in a second direction by centrifugal force related to speed of clutch rotation; and switch means connected to said power supply lead and said centrifugal member operative to deenergize said electromagnetic coil in response to movement of said centrifugal member in the second direction.

2. An electromagnetic clutch having disconnect mechanism as claimed in claim 1 wherein:

said cam means are an annular ring of teeth formed on an inner surface of said outer segment having a peak to root dimension greater than said mass centroid offset.

3. An electromagnetic clutch having disconnect mechanism as claimed in claim 1 wherein:

said first clutch member is a driven clutch member; and said second clutch member is a driving clutch member so that said centrifugal member is responsive to clutch driving speed.

4. An electromagnetic clutch having disconnect mechanism as claimed in claim 1 including:

spring means biasing said centrifugal member in said first direction maintaining said switch means normally closed for speeds below a value insufficient to overcome spring bias.

References Cited

UNITED STATES PATENTS

| 1,491,426 | 4/1924 | Schunemann | 192—56 X |
| 2,401,992 | 6/1946 | Waller | 192—56 |
| 3,166,170 | 1/1965 | Forster et al. | 192—56 XR |

BENJAMIN W. WYCHE III, *Primary Examiner.*

L. J. PAYNE, *Assistant Examiner.*